P. E. JACCARD.
CUTTING MACHINE.
APPLICATION FILED JUNE 22, 1909.
944,266.
Patented Dec. 28, 1909.
2 SHEETS—SHEET 1.
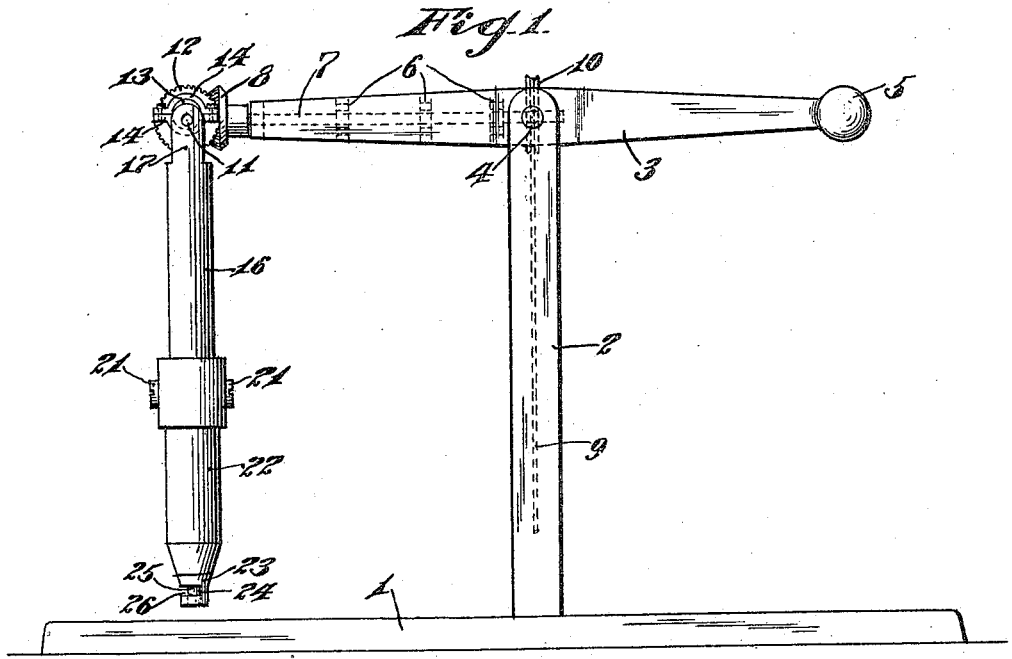
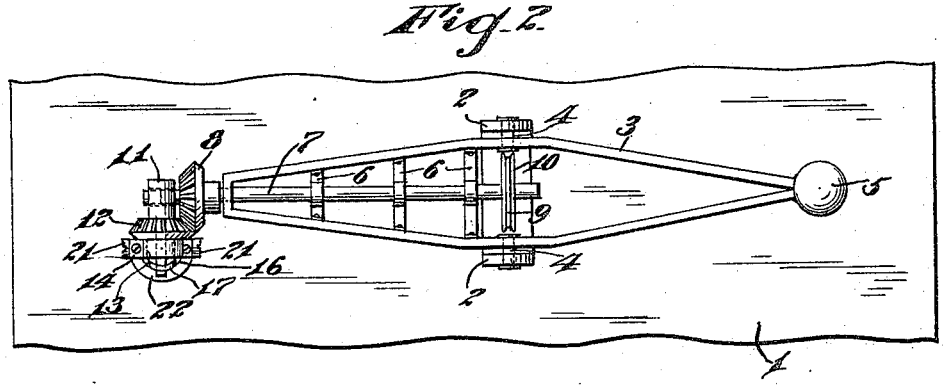
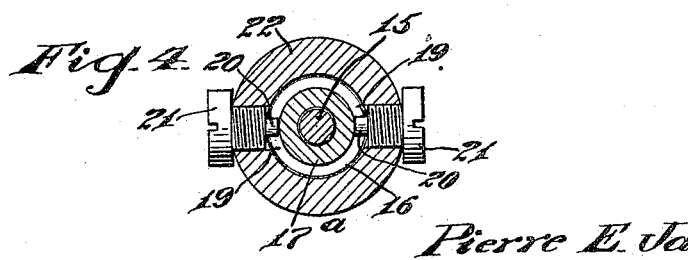
Witnesses
Theo. Rosemann
J. A. L. Mulhall
Inventor
Pierre E. Jaccard,
By Joshua R. H. Potts.
Attorney

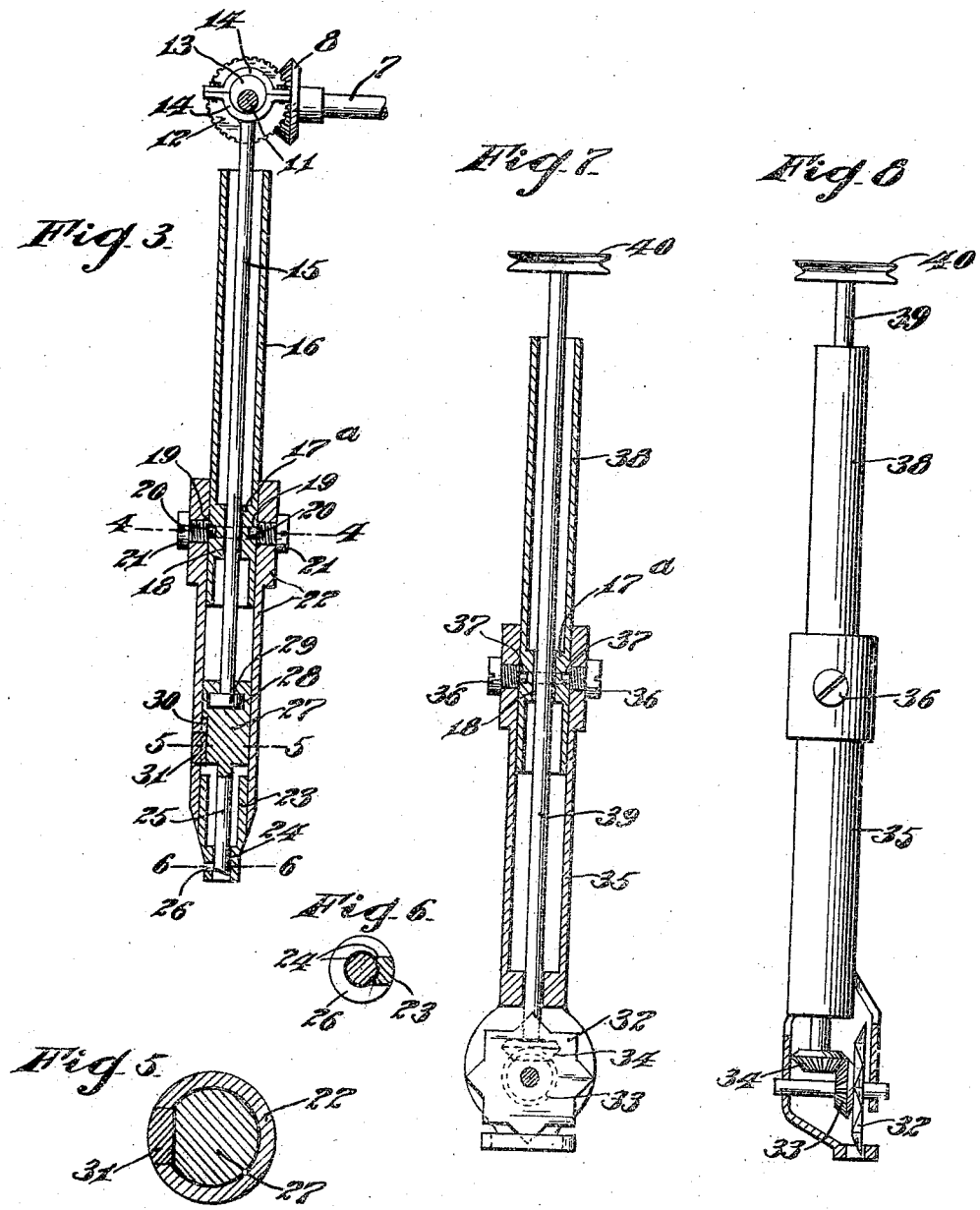

UNITED STATES PATENT OFFICE.

PIERRE E. JACCARD, OF CAMDEN, NEW JERSEY.

CUTTING-MACHINE.

944,266.

Specification of Letters Patent.   Patented Dec. 28, 1909.

Application filed June 22, 1909.   Serial No. 503,596.

*To all whom it may concern:*

Be it known that I, PIERRE E. JACCARD, a citizen of Switzerland, residing at Camden, in the county of Camden and State of New Jersey, have invented certain new and useful Improvements in Cutting-Machines, of which the following is a specification.

My invention relates to an improved cutting machine, which is designed primarily for cutting out patterns and designs in curtains and the like, the object of the invention being to provide improvements of this character, which will not only facilitate the cutting out of designs and patterns, but will result in a better manufacture at a reduced cost.

Heretofore patterns in curtains have been almost uniformly cut out by hand with shears, and as the work, in order to be at all profitable, must be done rapidly, or as rapidly as can be done by hand, the result has been in a great many instances, badly cut patterns.

The invention consists in certain novel features of construction, and combinations and arrangements of parts as will be more fully hereinafter described and pointed out in the claims.

In the accompanying drawings, Figure 1, is a view in elevation illustrating my improvements. Fig. 2, is a top plan view. Fig. 3, is a view in longitudinal section. Fig. 4, is a view in cross section on the line 4—4 of Fig. 3. Fig. 5, is a view in section on the line 5—5 of Fig. 3. Fig. 6, is a view in section on the line 6—6 of Fig. 3. Fig. 7, is a view in longitudinal section of a modified form of my invention, and Fig. 8, is a view in elevation partly in section at right angles to Fig. 7.

1 represents a supporting base or table, 2 an upright thereon, and 3 a lever or frame pivotally supported between its ends on trunnions 4 connected to the upper end of upright 2, and having a weight 5 at one end to counterbalance the device, as will more fully hereinafter appear.

The lever or frame 3 is preferably of the open work form, in which a series of bearings 6 are provided for a shaft 7, upon which latter a beveled gear 8 is secured, and this shaft may be driven by a belt 9 passing around a pulley 10 on the shaft, and driven from any source of power.

A short shaft stub 11 located at right angles to shaft 7, has an opening to receive the shaft to permit pivotal movement of the stub 11 on shaft 7. A beveled gear 12 loose on shaft 11 is driven by gear 8, and an eccentric 13 is locked to turn with gear 12, and turned within an eccentric strap 14 to reciprocate a rod 15, as will hereinafter appear. This rod reciprocates in a tube 16, the latter having a perforated ear 17 at its upper end, pivotally supported upon the stub 11.

The tube 16 is provided with an internal enlargement 17$^a$, having a restricted opening or passage 18 to guide rod 15 in its reciprocation, and center the latter. This enlarged or heavier portion 17$^a$ of tube 16, is made with an annular groove 19, into which lugs 20 at the inner ends of screws 21 project, said screws being projected into and through a sleeve 22, which permits the sleeve free turning movement on the tube 16.

In the lower end of sleeve 22, a foot piece 23 is secured in any approved manner, and is provided with an opening 24, through which the cutting plunger 25 is reciprocated by rod 15, and this foot portion is cut out as at 26 to receive the goods, and allow the cutter to be moved about as may be necessary to cut out the pattern.

The lower end of plunger 25 is inclined or beveled as shown, so that the cutting operation is thereby facilitated, and begins at least, at the same point of each stroke of the plunger. This plunger 25 is connected with a block or head 27 mounted to reciprocate in sleeve 22, and recessed as at 28 to receive a head 29 on rod 15, and connect the head 27 and rod, and permit free turning movement of the head on the rod.

In order to prevent rotary movement of head 27 in sleeve 22, the head is made with a flat recess as at 30, and a flat block or key 31 is secured in an opening in sleeve 22, and is located adjacent the flattened recess 30 of head 27, and while it permits free reciprocation of the head, will prevent any rotary movement of the head within the sleeve.

The operation is as follows: The goods to be cut are passed into the cut out portion 26 of the foot 23, and as the plunger 25 is reciprocated by rod 15, and the transmitting mechanism above described, the operator holding sleeve 22 can turn the same and move the machine about, so as to exactly follow the pattern and accurately cut out the design.

In the modification illustrated in Figs. 7 and 8, instead of employing a reciprocating cutting plunger, I have illustrated a rotary cutter as shown at 32, driven by beveled gears 33 and 34, and located in the lower end of a sleeve 35, which latter is provided with screws 36, projecting into a groove 37 in a tube 38, so that this sleeve 35 may act as a handle to allow the cutter to be manipulated as may be desired. The gear 34 is secured upon vertical shaft 39 in sleeve 35, and tube 38, and may be driven by a pulley 40, or other desired means.

Other slight changes might be made in the general form and arrangements of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In a machine of the character described, the combination with a tube, a sleeve mounted to turn around the tube, a cutter in said sleeve, means in said tube and sleeve for reciprocating said cutter and means in said tube preventing rotary movement of the cutter operating means.

2. In a machine of the character described, the combination with a tube having an annular groove therein, a sleeve around the tube, screws in the sleeve projecting into the groove in the tube, a cutter at the lower end of said sleeve, means in said tube and sleeve for operating said cutter, and means in said tube preventing rotary movement of the cutter operating means.

3. In a machine of the character described, the combination with a tube, a sleeve mounted to turn on the tube, a cutting plunger in said sleeve, a reciprocating rod connected to said plunger, and means for preventing rotary movement of the plunger in the sleeve.

4. In a machine of the character described, the combination with a tube, a sleeve mounted to turn on the tube, a reciprocating cutting plunger in the sleeve, a reciprocating rod in the tube and sleeve, and connected to said plunger, and a key in said sleeve engaging the plunger, and preventing rotary movement of the plunger in the sleeve.

5. In a machine of the character described, the combination with a tube having an annular groove, a sleeve on said tube, screws in said sleeve, lugs on said screws projecting into the groove in the tube, a foot in said sleeve, a cutting plunger in said sleeve, a head on said plunger having a recess, a reciprocating rod, a head on said rod in said recess, and means for preventing rotary movement of said head in said sleeve.

6. In a machine of the character described, the combination with a tube having an annular groove, a sleeve on said tube, screws in said sleeve, lugs on said screws projecting into the groove in the tube, a foot in said sleeve, a cutting plunger in said sleeve, a head on said plunger having a recess, a reciprocating rod, a head on said rod in said recess, means for preventing rotary movement of said head in said sleeve, an eccentric, and an eccentric strap around said eccentric and secured to said rod.

7. In a machine of the character described, the combination with a base, an upright thereon, a lever pivoted between its ends on said upright, a weight on one end of said lever, a shaft supported longitudinally in said lever, a drive pulley on said shaft, a pinion on said shaft, a shaft stub at right angles to said shaft and supported thereby, a pinion on said stub in mesh with the pinion on the shaft, an eccentric turned by said pinion on the stub, a tube supported on said stub, a rod in said tube, an eccentric strap secured to said rod and mounted around said eccentric, a sleeve mounted to turn on said tube, and a reciprocating cutting plunger in said sleeve connected to said rod.

In testimony whereof I have signed my name to this specification in the presence of two subscribing witnesses.

PIERRE E. JACCARD.

Witnesses:
OTTO H. SEIDEL,
GEO. HARIX.